United States Patent [19]

Betz et al.

[11] Patent Number: 4,866,115

[45] Date of Patent: Sep. 12, 1989

[54] SOLID MIXTURE OF NUCLEATED AND NONNUCLEATED POLYAMIDES

[75] Inventors: Walter Betz, Ludwigshafen; Eckhard M. Koch, Fussgoenheim; Christoph Plachetta, Limburgerhof; Gerd Blinne, Bobenheim; Karl Hahn, Maxdorf, all of Fed. Rep. of Germany

[73] Assignee: BASF Aktiengesellschaft, Ludwigshafen, Fed. Rep. of Germany

[21] Appl. No.: 228,520

[22] Filed: Aug. 5, 1988

[30] Foreign Application Priority Data

Aug. 6, 1988 [DE] Fed. Rep. of Germany ....... 3726125

[51] Int. Cl.[4] .......................... C08K 5/53; C08K 3/34; C08L 77/00

[52] U.S. Cl. .................................... 524/135; 524/451; 524/538; 525/432

[58] Field of Search ............... 524/139, 451, 538, 135; 525/432

[56] References Cited

U.S. PATENT DOCUMENTS

| | | | |
|---|---|---|---|
| 3,080,345 | 3/1963 | Brooks et al. | 524/399 |
| 4,501,844 | 2/1985 | Chen et al. | 524/451 |
| 4,556,696 | 12/1985 | Stewart et al. | 525/432 |

*Primary Examiner*—Lewis T. Jacobs

*Attorney, Agent, or Firm*—Oblon, Spivak, McClelland, Maier & Neustadt

[57] ABSTRACT

A solid mixture contains as essential components (A) from 40 to 99% by weight, based on the total weight of (A) and (B), of a nonnucleating thermoplastic polyamide and (B) from 1 to 60% by weight, based on the total weight of (A) and (B), of a thermoplastic polyamide which contains a nucleating agent, and in addition (C) from 0 to 60% by weight, based on the total weight of (A)+(B)+(C), of fibrous or particulate fillers.

13 Claims, No Drawings

SOLID MIXTURE OF NUCLEATED AND NONNUCLEATED POLYAMIDES

The present invention relates to solid mixtures containing as essential components (A) from 40 to 99% by weight, based on the total weight of (A) and (B), of a nonnucleating thermoplastic polyamide and (B) from 1 to 60% by weight, based on the total weight of (A) and (B), of a thermoplastic polyamide which contains a nucleating agent, and in addition (C) from 0 to 60% by weight, based on the total weight of (A)+(B)+(C), of fibrous or particulate fillers.

The present invention also relates to the use of such solid compositions for producing moldings and to moldings of heterogeneous spherulite size distribution which are obtainable from the solid mixtures according to the invention as essential components.

Polyamides are a class of plastics which have many uses, for example as housing materials, in automotive construction and in the building sector, to name but a few.

For many applications it would be desirable to have access to stiff polyamides which are still sufficiently impact resistant even at low temperatures.

The toughening of polyamides with elastomers (rubbers) to improve the impact resistance at low temperatures is long known and described in the literature. However, the addition of elastomers impairs the stiffness of polyamides, reducing in particular the modulus of elasticity to values which are not acceptable for many uses.

It is true that by adding glass fibers or other reinforcing fillers to elastomer-modified polyamides it is possible to improve the stiffness again, but this improvement goes hand in hand with a strong impairment of the impact resistance; moreover, as a consequence of orientation effects, reinforcing fillers frequently are associated with an anisotropy of the mechanical properties, i.e. with a strong variation in the mechanical properties as a function of whether they are measured in the direction of orientation of the fillers or perpendicularly thereto. This is frequently undesirable.

It is an object of the present invention to provide polyamide-based molding compositions from which it is possible to produce moldings of good stiffness (in particular a high modulus of elasticity) and good impact strength even at low temperatures.

We have found that this object is achieved according to an invention with the solid mixtures defined at the beginning and claimed in claim 1.

The solid mixtures according to the invention contain as essential component (A) from 40 to 99, preferably from 60 to 95, in particular from 75 to 90, % by weight, based on the total weight of components (A) and (B), of a nonnucleated thermoplastic polyamide, i.e. a polyamide containing essentially no additives acting as nucleating agents. This does of course not rule out the presence of other customary additives, for example pigments, dyes, lubricants, etc.

The polyamides used as component (A) are known per se. Semicrystalline or amorphous resins having a weight average molecular weight of not less than 5,000 as described for example in U.S. Pat. Nos. 2,071,250, 2,071,251, 2,130,523, 2,130,948, 2,241,322, 2,312,966, 2,512,606 and 3,393,210 are preferred.

Examples thereof are polyamides derived from lactams of 7–13 ring members, such as polycaprolactam, polycapryllactam and polylaurolactam, and also polyamides obtained by reacting dicarboxylic acids with diamines. Suitable dicarboxylic acids are alkane dicarboxylic acids of from 6 to 12, in particular from 6 to 10, carbon atoms and aromatic dicarboxylic acids. Nonlimiting examples are adipic acid, azelaic acid, sebacic acid, dodecanedioic acid and terephthalic and/or isophthalic acid.

Suitable diamines are in particular alkanediamines of from 4 to 12, in particular from 4 to 8, carbon atoms, and also m-xylylenediamine, di(4-aminophenyl)methane, di-(4-aminocyclohexyl)methane, 2,2-di(4-aminophenyl)propane or 2,2-di(4-aminocyclohexyl)propane. Also suitable are polyamides obtainable by copolymerization of two or more of the aforementioned monomers, or mixtures thereof.

Particular preference is given to polycaprolactam, polyhexamethyleneadipamide, copolyamides of caprolactam, terephthalic acid and hexamethylenediamine and copolyamides of adipic acid, terephthalic acid and hexamethylenediamine.

Processes for preparing these polyamides and the polyamides themselves are known per se and described in the literature, so that no details are required here.

The relative viscosity of the polyamides is in general within the range of 2.0 to 5.0, preferably from 2.2 to 4.5, measured in 1% strength solution in 96% strength sulfuric acid at 25° C.

Component B) of the solid mixtures according to the invention comprises from 1 to 60, preferably from 5 to 40, particularly preferably from 10 to 25, % by weight, based on the total weight of components (A) and (B), of a thermoplastic polyamide which contains a nucleating agent.

The polyamide is subject to the observations made above for component (A), to which reference is made for conciseness.

In general, it is preferred to use the same polyamide in components (A) and (B); however, it is also possible to use two polyamides composed of different repeat units or polyamides composed of the same repeat units but having different molecular weights.

The nucleating agents used are low or high molecular weight compounds known per se for this purpose which bring about faster and better crystallization of the polyamide.

Nonlimiting examples of nucleating agents are nylon-6,6, polyamides of terephthalic acid and hexamethylenediamine,nylon-2,2, polyethylene terephthalate, finely divided silica, sodium phenylphosphinate, talc and various metal oxides, metal hydroxides or metal salts, as described in U.S. Pat. No. 3,080,345 and BE-A No. 622,933.

The general effect of nucleation is to bring about substantially smaller spherulites in the solid and also in the molding than in similar nonnucleated polyamides.

The higher degree of crystallization in nucleated polyamides generally leads to an increase in the moduli of flexure and elasticity, a higher surface hardness and to an increase in the heat distortion resistance. The elongation at break and the impact strength, however, are generally adversely affected, i.e., the corresponding values become inferior (see also Comparative Example 2).

The proportion of nucleating agent in component (B) does of course depend not only on the type of polyamide used but also on the nucleating agent used. In general, component (B) contains from 0.001 to 2.5, preferably from 0.005 to 1.5, in particular from 0.01 to 1, % by weight, based on (B), of nucleating agent.

Because of their high efficacy even in low concentrations, preference is given to talc, nylon-2,2 and sodium phenylphosphinate.

The particle size of the solids in the mixtures according to the invention is not critical per se and is in general within the range from 10 μm to 5 cm, preferably from 1 mm to 10 mm.

The solid mixtures according to the invention may contain as component (C) up to 60, preferably from 5 to 50, in particular from 10 to 45, % by weight, based on the total weight of components (A) to (C), of fibrous or particulate fillers and reinforcers. It will be readily understood that these fillers and reinforcers are different from the nucleating agents present in component (B).

Nonlimiting examples of reinforcing fillers are fibrous fillers such as glass fibers, carbon fibers and fibrous silicates such as wollastonite and also glass balls. As mentioned at the beginning, these fibrous fillers are frequently associated with a certain degree of anisotropy of the mechanical properties; for this reason, filler-containing molding compositions according to the invention are preferably used wherever this degree of anisotropy is not disadvantageous. In any case, filled solid mixtures according to the present invention have improved impact strength at low temperatures compared with conventional filler-containing polyamides which contain only granules.

The fillers can be present not only in component (A) but also in component (B) or in both components. In principle, it is also possible to add the fillers immediately prior to the processing of the mixture into moldings, but with the last variant it is not always possible to obtain a uniform distribution of the fillers. For this reason it is generally preferred to incorporate the fillers into components (A) and/or (B) in a separate compounding step prior to the mixing of the solids.

It is to be noted that the addition of fillers to the solid mixture and subsequent compounding is not advantageous in every case, since, if melted repeatedly, the solid mixtures on compounding frequently no longer show the advantageous properties in the end-products in as marked a degree as when moldings are produced directly from the solid mixtures. Generally, it is advantageous to minimize the number of times the solid mixtures are melted before the moldings are produced, more particularly to avoid any melting entirely before the final processing stage.

Aside from components (A), (B) and optionally (C) the solid mixtures according to the invention may contain customary additives and processing aids.

In general they account for up to 10, preferably up to 5, % by weight, based on the total weight of the solid mixture.

Customary additives are for example stabilizers and oxidation retarders, agents against thermal decomposition and decomposition by ultraviolet light, lubricants, mold release agents, colorants such as dyes and pigments and plasticizers.

Oxidation retarders and thermal stabilizers which can be added to the solid mixtures according to the invention are for example halides of metals of group I of the periodic table, for example a sodium, potassium or lithium halide, alone or combined with copper(I) halides, for example chlorides, bromides or iodides. It is also possible to use sterically hindered phenols, hydroquinones, substituted representatives of this group and mixtures thereof, preferably in concentrations of up to 1% by weight, based on the weight of the molding compositions.

Examples of UV stabilizers are various substituted resorcinols, salicylates, benzotriazoles and benzophenones, which in general are used in amounts of up to 2.0% by weight.

Lubricants and mold release agents, which in general are used in amounts of up to 1% by weight of the solid mixture, are stearic acids, stearyl alcohol, alkyl stearates, stearamides and esters of pentaerythritol with long-chain fatty acids.

Additives also include flameproofing agents known per se for polyamides, in particular phosphorus compounds or red phosphorus itself and also the flameproofing agent combinations described in DE-A No. 2,740,092 and EP-A No. 55,893.

The solid mixtures according to the invention can be prepared directly by simple physical mixing with or without appropriate mixing apparatus. Mixing by way of melting should be avoided on account of the abovementioned disadvantages.

Owing to their advantageous properties, the solid mixtures according to the invention are suitable in particular for producing films and moldings by injection molding or extrusion. Such methods of processing are well-known to those skilled in the art.

The moldings obtained in this manner have on the whole a very high and even level of mechanical properties.

On analyzing moldings produced from the solid mixtures according to the invention (for example using a polarizing microscope) they are frequently found to have a heterogeneous spherulite size distribution; that is, the molding has adjacent regions of substantially different spherulite sizes.

This is probably due to the fact that in the course of a single melting the nucleating agent found in component (B) does not become homogeneously dispersed and that there are thus present even in the melt regions of widely differing spherulite sizes which then feed through into the molding.

This view is confirmed by the fact that the spherulite size heterogeneity decreases markedly on subjecting the solid mixtures to melt compounding prior to the actual processing.

This homogenization due to repeated melting is also accompanied by the abovementioned deterioration in the mechanical properties, so that there is perhaps a connection between the two effects.

EXAMPLES

The solid mixtures were produced using the following components:

Component A

Polyhexamethyleneadipamide (nylon-6,6) (in granule form) having a viscosity number of 143 $cm^3/g$ (measured in accordance with German Standard Specification DIN 53,727) (obtainable as Ultramid® from BASF AG).

Component B

B/1 nylon-6,6 (corresponding to the product used as component (A) was admixed with 0.1% by weight of sodium phenylphosphinate, melted in a twin-screw extruder at 290° C., mixed, extruded and granulated.

B/2 nylon-6,6 (as in component B/1) was admixed with 0.2% by weight of nylon-2,2 and compounded like B/1.

B/3 nylon-6,6 (as in component B/1) was admixed with 0.1% by weight of talc and compounded like B/1.

B/c for comparison nylon-6,6 (as in B/1) was mixed with 0.002% by weight of talc and compounded like B/1.

To produce moldings, components (A) and (B) were mixed, melted and injection molded at a melt temperature of 290° C. and a mold surface temperature of 80° C. into tiles 100×100 mm in size and 2 mm in thickness.

These tiles were blanked for roundels 60 mm in diameter on which the damaging energy (multiaxial impact strength) was determined in line with German Standard Specification DIN 53,443 using a fall speed of 5.3 m/s.

The composition of the mixtures and the results of the measurements are given in the table below.

TABLE (all quantities in % by weight)

| Example | 1c | 2c | 3 | 4 | 5 |
|---|---|---|---|---|---|
| Component A | 100 | | 85 | 85 | 85 |
| Component B | — | 100 B/c | 15 B/1 | 15 B/2 | 15 B/3 |
| Damaging energy (nm) | | | | | |
| at 23° C. | 135 | 40 | 120 | 90 | 125 |
| −20° C. | 30 | 15 | 74 | 50 | 105 |

c = comparative test

The Examples show the superior properties of moldings from the mixtures according to the invention compared with prior art products; the superiority is particularly clear at low temperatures.

We claim:

1. A solid mixture containing as essential components (A) from 40 to 99% by weight, based on the total weight of (A) and (B), of a nonnucleating thermoplastic polyamide and (B) from 1 to 60% by weight, based on the total weight of (A) and (B), of a thermoplastic polyamide which contains a nucleating agent, and in addition (C) from 0 to 60% by weight, based on the total weight of (A)+(B)+(C), of fibrous or particulate fillers or mixtures thereof.

2. A solid mixture as claimed in claim 1, wherein the content of nucleating agent in component (B) is from 0.001 to 2.5% by weight, based on (B).

3. A solid mixture as claimed in claim 1, containing (A) from 60 to 95% by weight and (B) from 5 to 40% by weight.

4. A solid mixture as claimed in claim 1, wherein the polyamides present in components (A) and (B) are polycaprolactam, polyhexamethyleneadipamide, copolyamides of caprolactam, terephthalic acid and hexamethylenediamine, copolyamides of adipic acid, terephthalic acid and hexamethylenediamine or mixtures thereof.

5. A solid mixture as claimed in claim 1, wherein component (B) contains sodium phenylphosphinate as nucleating agent.

6. A solid mixture as claimed in claim 1, wherein component (B) contains talc as nucleating agent.

7. A solid mixture as claimed in claim 1, wherein component B contains nylon-2,2 as nucleating agent.

8. A solid mixture as claimed in claim 1, wherein at least one of the components (A) or (B) contains from 5 to 60% by weight, based on (A) or (B), of a fibrous or particulate filler different from the nucleating agent in component (B).

9. A molding obtainable from a solid mixture as claimed in claim 1 as essential component.

10. A molding of heterogeneous spherulite size distribution obtainable from a solid mixture as claimed in claim 1 as essential component.

11. A molding obtainable from a solid mixture as claimed in claim 5 as essential component.

12. A molding obtainable from a solid mixture as claimed in claim 6 as essential component.

13. A molding obtainable from a solid mixture as claimed in claim 7 as essential component.

* * * * *